Jan. 20, 1959   P. C. JURS ET AL   2,869,239
TANK GAUGING APPARATUS
Filed Feb. 24, 1955   3 Sheets-Sheet 1
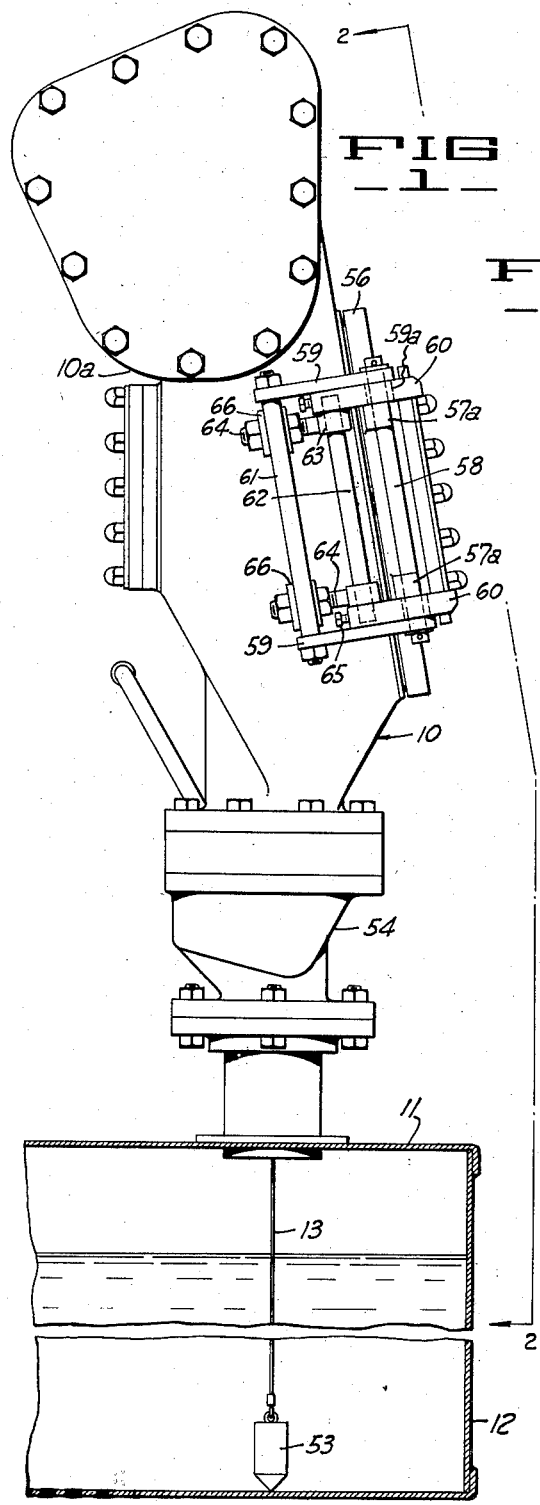
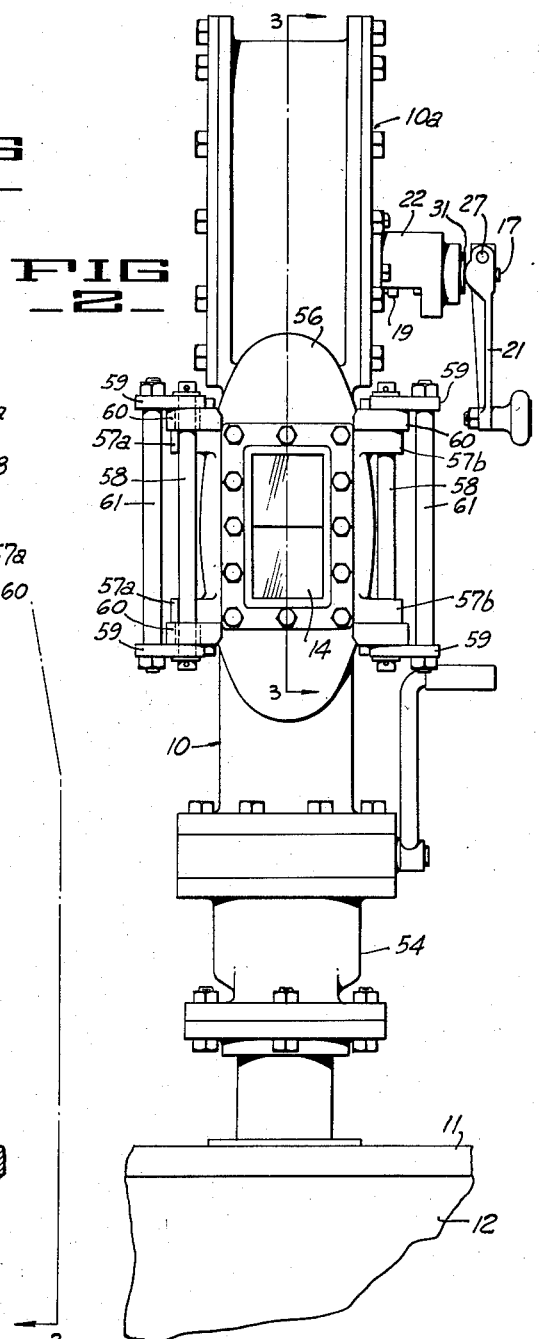
INVENTORS
Peter C. Jurs
Joseph P. Van Overveen
Robert W. Blake
BY
ATTORNEYS

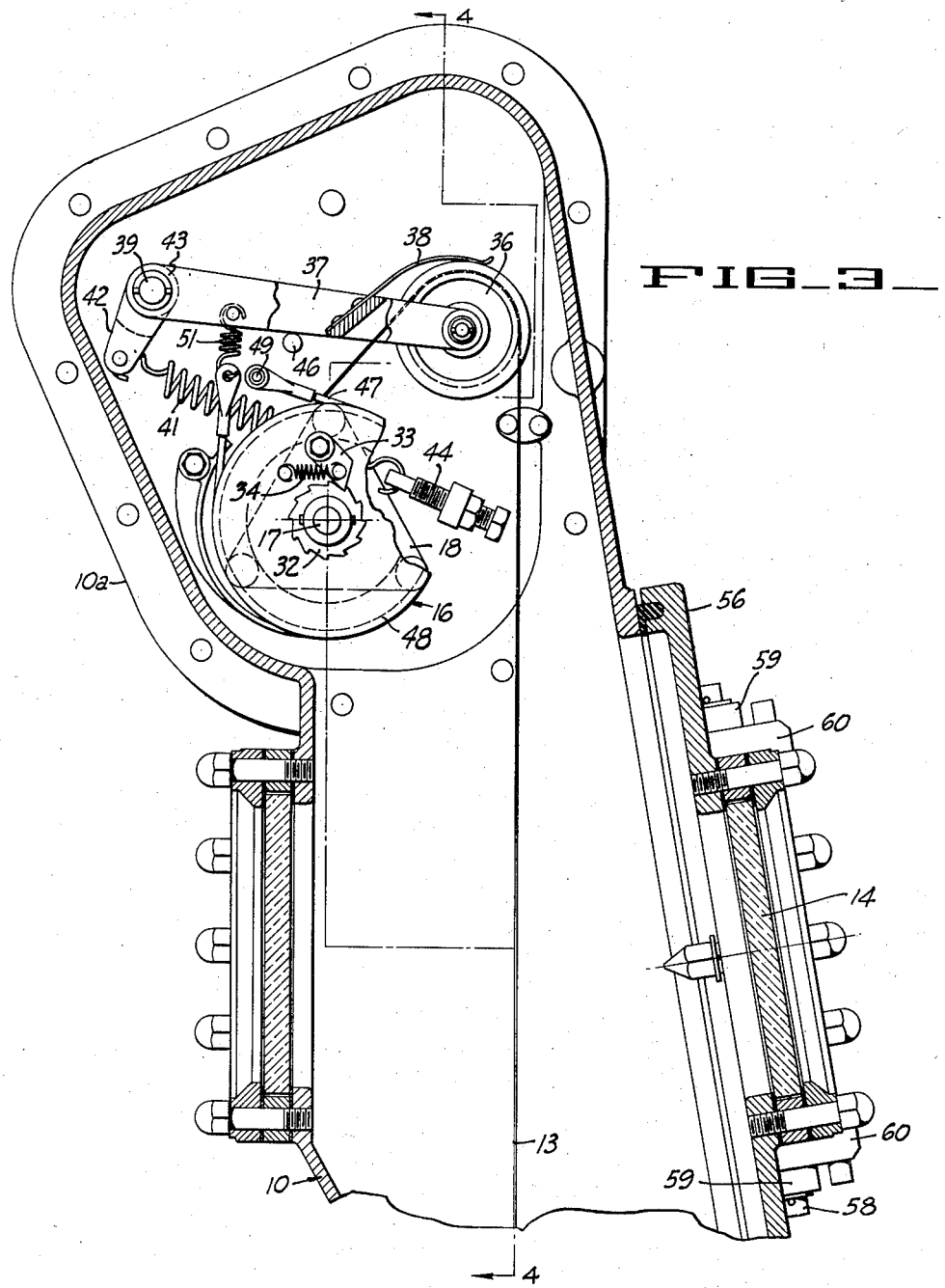

Jan. 20, 1959  P. C. JURS ET AL  2,869,239
TANK GAUGING APPARATUS
Filed Feb. 24, 1955
3 Sheets-Sheet 3
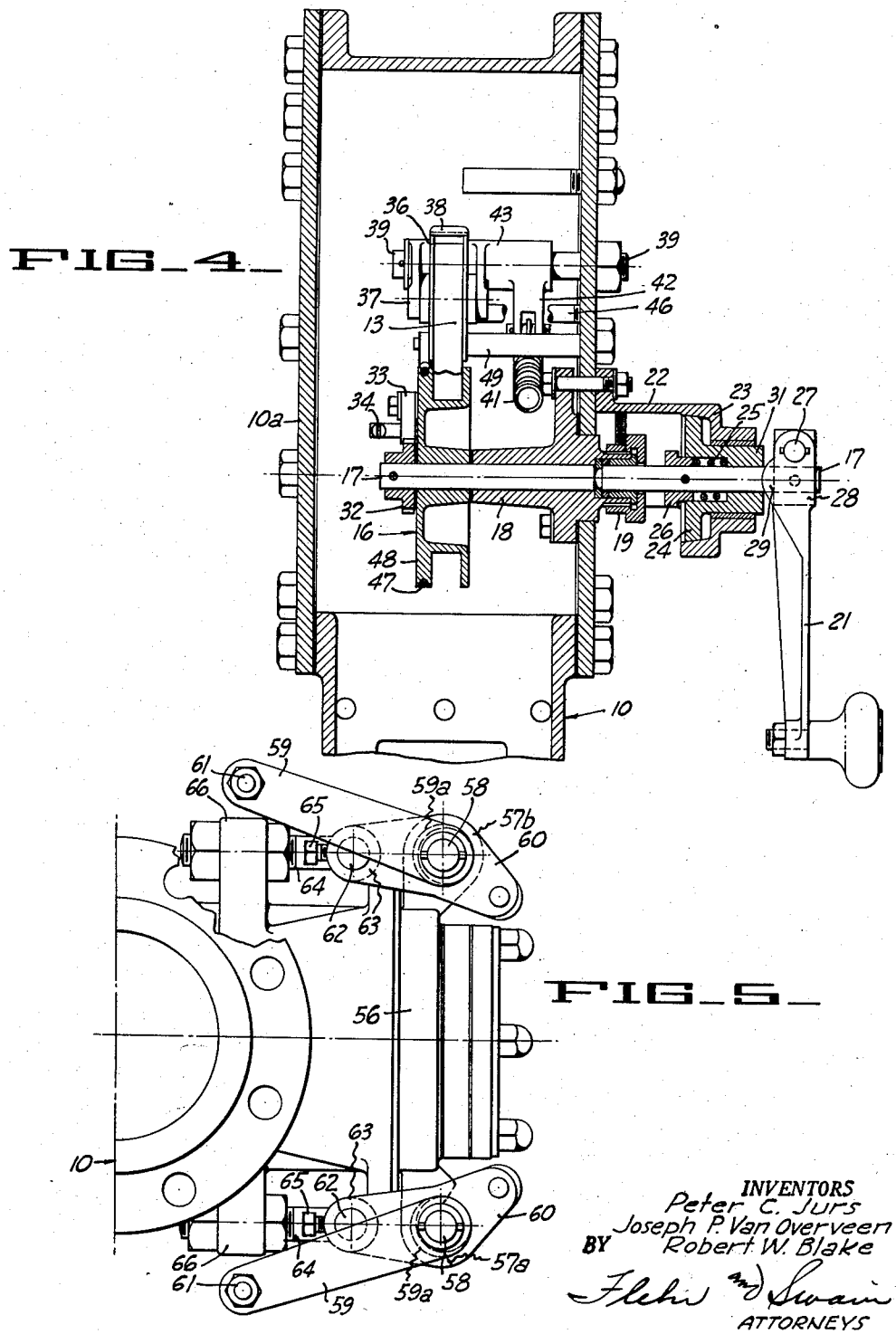
INVENTORS
Peter C. Jurs
Joseph P. Van Overveen
Robert W. Blake
BY
ATTORNEYS

United States Patent Office 2,869,239
Patented Jan. 20, 1959

2,869,239

TANK GAUGING APPARATUS

Peter C. Jurs, Oakland, and Joseph P. Van Overveen, Lafayette, Calif., and Robert Wilson Blake, Chicago, Ill., assignors to Spand and Jurs Co., Berkeley, Calif., a corporation of California Application February 24, 1955, Serial No. 490,184

7 Claims. (Cl. 33—126.6)

This invention relates generally to apparatus for measuring the height of liquid in tanks or other containers.

Tank gauging apparatus, such as is commonly used in the petroleum industry, generally employs a metal tape or like flexible gauging element which has a weight attached to its lower end, and which is carried by reeling means to permit raising or lowering as desired. The weight may be a simple bob, or it may be one of the type capable of temporarily floating upon the surface of the liquid, thereby providing both liquid surface and tank bottom positions. The latter type of bob is made hollow with small liquid flow holes in its bottom and smaller vent holes in its top whereby when deposited on liquid, it slowly fills and then settles to the bottom of the tank. In many instances it is desirable for such gauging apparatus to incorporate means for automatically arresting unwinding rotation of the reel responsive to stoppage of downward movement of the weight, as for example, when the weight comes to rest upon the bottom of the tank. Such an arrangement is disclosed in Larson 2,265,736. Particularly such apparatus prevents false level readings which might otherwise be caused by a condition of tape slack immediately following contact of the weight with the bottom of the tank. Commercial apparatus incorporating such an arrangement has some disadvantages. Particularly the automatic mechanism employed serves to lock the reel against further rotation when downward movement of the weight is arrested. This locking action causes sudden stoppage of the reel and its operating crank, thus subjecting certain parts to excessive shock stresses and wear.

In general it is an object of the present invention to provide an improved tank gauging apparatus of the type having automatic means to prevent further unreeling of the gauging element when downward movement of the weight is arrested.

Another object of the invention is to provide tank gauging apparatus of the above character in which the reel is suddenly arrested when downward movement of the weight is arrested, without suddenly arresting the operating crank.

Further objects of the invention will appear from the following description in which the preferred embodiment has been set forth in detail in conjunction with the accompanying drawing:

Referring to the drawing:

Figure 1 is a side elevational view illustrating apparatus incorporating the present invention installed in connection with a closed tank for the storage of liquid products.

Figure 2 is a front view of the apparatus shown in Figure 1.

Figure 3 is an enlarged side elevational view of the apparatus, with the housing in section, and illustrating the working parts.

Figure 4 is a cross sectional view taken along the line 4—4 of Figure 3.

Figure 5 is a detail in plan illustrating particularly the means for mounting and operating the front closure door.

The apparatus illustrated in Figures 1-3 of the drawing consists of a housing 10 adapted to be mounted upon the roof 11 of the storage tank 12. The upper portion 10a of the housing serves to carry the reeling means shown in Figure 3, which engages the metal gauging tape 13 or like elongated flexible gauging element. Graduations upon the tape 13 may be read through the window 14, the mounting of which will be presently described in detail.

The reeling means for the tape includes a reel 16 which is rotatably carried by the horizontal shaft 17. The shaft is carried by the journal 18 and extends to the exterior of the housing through the sealing gland 19. A crank 21 is attached to the exterior end of the shaft 17, and preferably is associated with locking means whereby when the crank is not engaged by the hand of the operator, the shaft 17 is locked against rotation. Thus a bracket 22 is mounted upon one side of the housing, and formed to provide the stationary conical shaped clutch member 23. Complementary clutch member 24 is urged toward engaged position with respect to the clutch member 23, by compression spring 25. Member 24 may move longitudinally of the shaft between clutch engaged and disengaged positions, and is not rotatable relative to the shaft by virtue of a driving key 26 that is attached to the shaft and which is engaged by lugs (not shown) on the clutch member 24. The handle or crank 21 is attached by pivot pin 27 to the member 28, which in turn is fixed to the corresponding end of shaft 17. Cam elements 29 are formed on the handle, and are arranged to engage the outer surface to the hub 31 that carries the clutch member 24. In normal operation the operator swings the crank 21 a short distance toward the housing 10, and this serves to move the clutch member 24 to released position with respect to the clutch member 23, with the result that thereafter the crank and shaft turn freely.

Uni-directional drive means is provided between the reel 16 and the shaft 17. Preferably this consists of a toothed ratchet wheel 32 (Figure 3) fixed to shaft 17, and which is adapted to be engaged by the pawl 33. The pawl is pivotally carried by the reel and is urged toward engaged position by tension spring 34.

The tape 13 is looped over an idler pulley 36 (Figure 3) which is journaled on the free end of an arm 37. The pulley 36 is flanged, and accidental displacement of the tape from between the flanges is prevented by the keeper 38. This can be in the form of a flat spring member attached to the arm 37 and having its free end overlying the pulley. A stationary shaft 39 serves to mount the arm 37 for movements in a vertical plane coincident with the vertical plane of the reel 16. The tension spring 41 serves as means urging the arm 37 upwardly (Figure 3) thereby maintaining a desired tape tension during gauging operations. One end of spring 41 is attached to the arm 42, which in turn is attached to the mounting hub 43 (Figure 4) for the arm 37. The other end of the spring is attached to the adjustable anchoring screw 44 (Figure 3). A stationary pin 46 serves as a stop to limit downward movement of the arm 37.

Friction braking means is associated with the reel 16 and is connected to be operated by movements of the arm 37. Preferably the braking means consists of the flexible cable or like member 47 which is wrapped about the grooved brake drum or wheel 48, the latter being an integral part of the reel 16. One end of the element 47 is anchored by pin 49 to the housing, and the other end is attached by tension spring 51 to the arm 37. Because one end of the element 47 is anchored to the fixed housing, the braking action is self-energizing.

For the positioning of parts shown in Figure 3, the arm 37 is positioned whereby spring 51 applies no tension and the brake is relieved, thus permitting reel 16 to rotate freely in either direction. As arm 37 swings upwardly from the lowermost position shown in Figure 3, spring 51 applies tension to element 47, whereby the reel is braked against clockwise rotation. The braking means is self-relieving whereby counter-clockwise rotation of reel 16 under such conditions is permitted. When reel 16 is arrested or braked against clockwise rotation by the tension applied to element 47, continued operation of crank 21 rotates shaft 17 freely within the arrested reel 16, while ratchet wheel 32 rotates freely relative to the pawl 33.

As illustrated particularly in Figures 1 and 2, the housing 10 can be mounted upon the roof 11 of the tank 12, with the metal gauging tape 13 extending down into the tank, with a weight 53 or bob attached to its lower end. The fittings used for attachment of the housing to the tank or roof can include valve means 54 which can be operated to provide a seal about the tape.

It is desirable to mount the window 14 whereby after the valve 54 has been closed, the window can be opened for access into the housing. The mounting means illustrated for this purpose consists of a door structure 56 which mounts the window 14, and which is provided with the tabs 57a and 57b on its vertical side edges (Figure 1).

Rods 58 engage the tabs 57a and 57b, and the upper and lower ends of these rods are connected by links 59 to the corresponding upper and lower ends of rods 61. Rods 58 are also connected by links 60 to rods 62, which have their upper and lower ends rotatably carried by collars 63. Adjustable screws 64 serve to secure collar 63 to the tabs 66, the latter being carried by the sides of the housing 10a. Suitable means such as the set screws 65, serve to attach links 60 to the rods 62, and serve to retain rods 62 in place. The forward portions of links 59 are also provided with integral hubs 59a which are journaled in links 60 on centers of rotation eccentric with respect to the axes of the corresponding rods 58. The tabs 57a on one side of the door structure are open lugs, to permit disengagement with respect to the associated rod 58. When the rod 61 on the left hand side (as viewed in Figure 2) is moved outwardly and forwardly, the associated links 59 are journaled to links 60 eccentrically from the center of the associated rod 58, the rod 58 is moved forwardly out of engagement with the lugs 57a. This permits the rod 58 to be swung away from the door. At the same time that this operation takes place, or immediately thereafter, the other rod 61 is swung outwardly and forwardly whereby the corresponding rod 58 moves forwardly to force the door away from the housing and thereby break the seal. The door is then swung to full open position.

The gauging apparatus described above operates as follows: It is assumed that the apparatus is installed upon the top of a tank in the manner illustrated in Figures 1 and 2. When the operator desires to lower the gauging tape, the handle 21 is engaged to unlock the clutch members 23 and 24, after which it is turned to lower the tape and the weight or bob attached to its lower end. Under such conditions the arm 37 is in engagement with the stop pin 46, and the pawl 33 is in engaged position with respect to the ratchet wheel 32. As viewed in Figure 3, the rotation of the reel is clockwise. When the weight engages the bottom of the tank downward movement is arrested and as a result a small amount of additional rotation of the reel results in raising the arm 37 under the urge of spring 41. Raising of arm 37 serves to brake the reel by increasing the tension applied through spring 51. As a result a small amount of turning movement of the reel, following contact of the weight with the bottom of the tank, is sufficient to arrest the reel against further rotation, whereby when the operator continues to turn the crank in a direction to lower the weight, the crank and shaft 17 turn freely, without corresponding rotation of the reel. The tape now remains in tensioned condition, even though the operator may disengage his hand from the crank 21. When it is desired to raise the tape, the operator again engages the handle 21 to disengage the clutch members 23 and 24, and the crank is turned in the other direction. Driving torque is applied through the ratchet reel 32 and the pawl 33, to rotate the reel in a counter clockwise direction as viewed in Figure 3. Such rotation is permitted irrespective of the tensioning being applied to the braking member 47, because of the self-relieving action previously mentioned. During initial rotation of the reel 16, arm 37 is moved against the stop 46, thus removing the tension upon the braking member 47. Thereafter the reel is rotated to bring the tape to a desired position for noting the liquid level mark on the same. The liquid level mark on the tape is read through the window 14 in a manner well understood by those familiar with the tank gauging equipment.

The same operation described above can be carried out when a hollow bob is used, capable of floating for a temporary period upon the surface of the liquid. In such event rotation of the reel to unwind the tape is arrested when the bob floats on the surface of the liquid, thus permitting the operator to obtain an indication of the surface level to check against level readings obtained in a subsequent gauging with the bob in the bottom of the tank.

It will be evident that the gauging apparatus described above is an improvement over prior types of apparatus wherein the reel and crank are suddenly and positively locked against rotation when downward movement of the weight is arrested. With the present apparatus no parts are subjected to shock stresses or excessive wear, and there is no danger of mechanical breakage by overzealous operation or mechanical abuse. At the same time the reeling of the tape is effectively and automatically controlled to prevent the possibility of undue tape slack during gauging operations.

We claim:

1. In tank gauging apparatus, an elongated flexible gauging element adapted to extend downwardly into a tank, a weight attached to the lower end of said element, a reel upon which the element is wound whereby upon turning the reel the element is raised or lowered, a shaft upon which the reel is journaled, ratchet drive means connecting the reel and the shaft and serving to permit relative rotation between the reel and the shaft in one direction, a friction brake drum rotatable together with the reel, braking means engaging said drum including an element wrapped about the drum and having its one end secured to a fixed anchorage and its other end movable to tighten the same about the drum, a pivoted arm having its free end movable in a vertical direction, a pulley journaled on the free end of the arm and engaged by an upwardly extending loop of said element, spring means serving to urge said arm in a direction to raise said pulley, and an operating connection between said arm and said other end of the brake element, whereby when said arm moves upwardly responsive to a reduction in tension of the flexible element, said brake element is tightened about the brake drum.

2. Gauging apparatus as in claim 1 in which the braking means is self releasing for rotation of the reel in a direction to wind up the flexible element.

3. In tank gauging apparatus, an elongated flexible element adapted to extend downwardly into a tank, a weight attached to the lower end of said element, a reel upon which the element is wound whereby upon turning the reel the element is raised or lowered, a shaft upon which the reel is journaled, ratchet drive means connecting the reel and the shaft and serving to permit relative rotation between the reel and the shaft in one direction, a friction brake drum rotatable with said reel, braking means engaging said brake drum including an element wrapped about the drum and having its one end secured to a fixed anchorage and its other end movable to tighten the same about the drum, and means operatively connected to the movable end of the braking element to move the braking element into engagement with the brake drum responsive to stoppage of downward movement of the weight during lowering of the same.

4. Gauging means as in claim 3 in which the braking means is self releasing for rotation of the reel in a direction to wind up the flexible element.

5. Gauging apparatus as in claim 3 wherein said last named means includes a pivoted arm having its free end movable in a vertical direction, a pulley journalled on the free end of the arm and engaged by an upwardly extending loop of said element, spring means serving to urge said arm in a direction upwardly and away from said reel, and an operating connection between said arm and said other end of the brake element whereby when said arm moves upwardly responsive to reduction in tension of the flexible element, said brake element is tightened about the brake drum.

6. Gauging apparatus as in claim 5 wherein the operating connection between the arm and the other end of the brake element is a spring.

7. In tank gauging apparatus, an elongated flexible gauging element adapted to extend downwardly into a tank, a weight attached to the lower end of said element, a reel upon which the element is wound whereby upon turning the reel the element is raised or lowered, a shaft upon which the reel is journalled, ratchet drive means connecting the reel and the shaft and serving to permit relative rotation between the reel and the shaft in one direction, said reel being formed with an angular groove in one side edge of same to provide a brake drum, a flexible cable-like element wrapped about said drum and having its one end secured to a fixed anchorage and its other end movable to tighten the same about the drum, a pivoted arm having its free end movable in a vertical direction, a pulley journalled on the free end of said arm and engaged by an upwardly extending loop of said element, spring means serving to urge said arm in a direction to raise said pulley, and additional spring means having one end connected to said other end of said flexible element, and having its other end connected to the said arm between the pivoted and free ends of said arm.

References Cited in the file of this patent

UNITED STATES PATENTS

| | | |
|---|---|---|
| 30,616 | Colton | Nov. 13, 1860 |
| 51,592 | Hynes | Dec. 19, 1865 |
| 233,450 | Wickham | Oct. 19, 1880 |
| 314,207 | Ward | Mar. 17, 1885 |
| 517,405 | Gerbig | Mar. 27, 1894 |
| 529,378 | Hackman et al. | Nov. 20, 1894 |
| 564,218 | Palmer | July 21, 1896 |
| 1,031,302 | Tucker | July 2, 1912 |
| 1,622,785 | Hollingsworth | Mar. 29, 1927 |
| 2,131,868 | Bolton et al. | Oct. 4, 1938 |
| 2,265,736 | Larson | Dec. 9, 1941 |

UNITED STATES PATENT OFFICE

CERTIFICATE OF CORRECTION

Patent No. 2,869,239                                      January 20, 1959

Peter C. Jurs et al.

It is hereby certified that error appears in the above numbered patent requiring correction and that the said Letters Patent should read as corrected below.

In the grant, lines 3 and 13, and in the heading to the printed specification, line 5, name of assignee, for "Spand and Jurs Co.", each occurrence, read -- Shand and Jurs Co. --.

Signed and sealed this 9th day of June 1959.

(SEAL)
Attest:

KARL H. AXLINE
Attesting Officer

ROBERT C. WATSON
Commissioner of Patents